March 25, 1958    R. E. BROWN    2,827,790
OSCILLATING TEST TABLE
Filed May 6, 1955    2 Sheets-Sheet 1

RALPH E. BROWN,
INVENTOR.

BY George J. Smyth
ATTORNEY.

March 25, 1958 R. E. BROWN 2,827,790
OSCILLATING TEST TABLE
Filed May 6, 1955 2 Sheets-Sheet 2
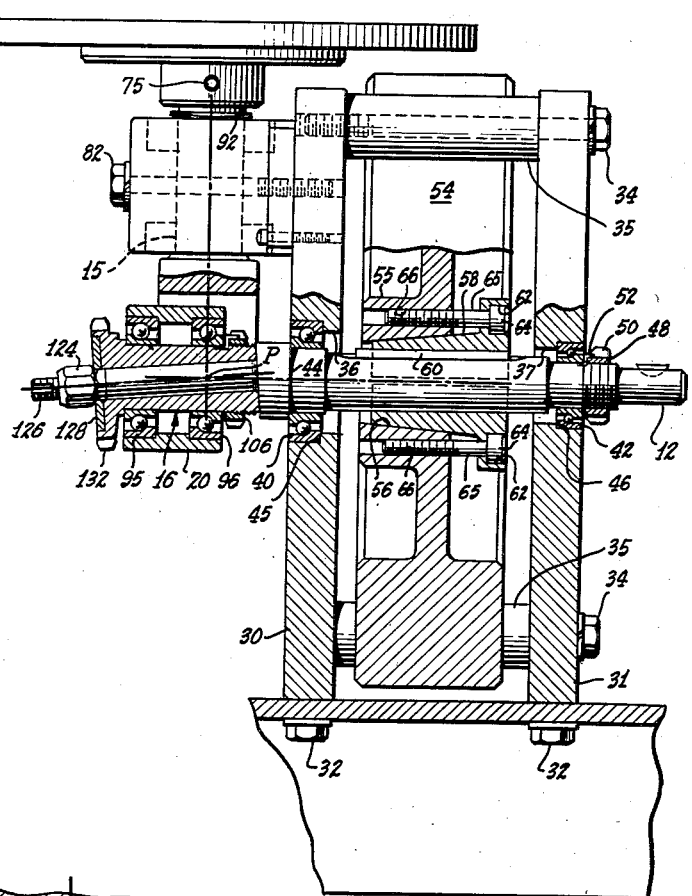
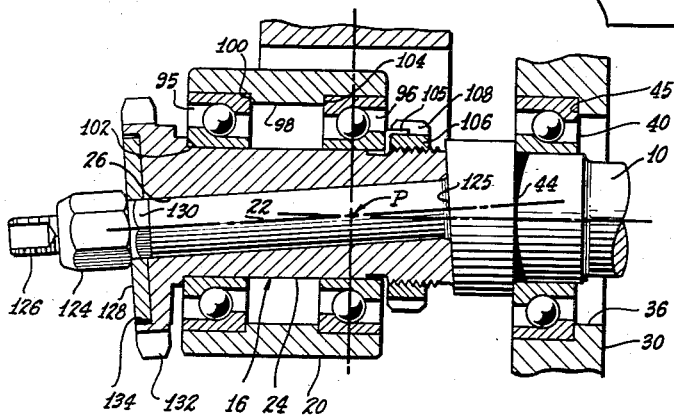
RALPH E. BROWN,
INVENTOR.
ATTORNEY.

United States Patent Office 2,827,790
Patented Mar. 25, 1958

2,827,790

OSCILLATING TEST TABLE

Ralph E. Brown, Los Angeles, Calif., assignor to Genisco, Inc., Los Angeles, Calif., a corporation Application May 6, 1955, Serial No. 506,521

13 Claims. (Cl. 74—25)

This invention relates to means and methods for operating driven members and is directed specifically to means for oscillating a table or the like in a sinusoidal manner for testing various devices.

One purpose of such an operating table is, of course, to test an instrument such as a gyroscope or the like with respect to its response to a predetermined changing rate of angular displacement. A less obvious but equally important purpose is to provide an environmental test for various devices and components that are intended to function under conditions of angular or rotary oscillation.

It is common practice to subject various instrumentalities to shock tests and linear vibration tests to ascertain their capability for proper functioning in the intended environments. It has been found, however, that such tests may be inconclusive for service conditions involving angular displacement and especially angular vibration. For example, a counterpoised device functioning with a pivot action, such as a counterbalanced relay, may be immune to linear vibration but vulnerable to angular vibration. A purpose of the invention, therefore, is to provide an environmental test for detecting and/or measuring responsiveness to angular vibration as distinguished from linear vibration.

For a number of reasons it is desirable to provide a test apparatus for this purpose in which the changes in rate and direction of the angular movement occur in a true sinusoidal manner. One reason is that a sinusoidal rate of change of angular velocity provides a convenient and exact reference pattern with which the responses of a test device may be compared. Another reason is that smooth sinusoidal changes in the rate of angular velocity are less likely to damage devices under test than relatively abrupt changes. A third reason is that gradual acceleration and deceleration are conducive to sustained efficiency and long service life on the part of the test apparatus itself.

A Scotch yoke mechanism produces pure sinusoidal motion but involves difficult problems of minimizing wear and backlash. In a crank mechanism these problems are not troublesome because in contrast to an operation of a Scotch yoke mechanism all of the movements involved may be simple pivotal movements and the required pivotal connections may incorporate highly efficient rotary bearings or avoiding the consequences of wear and for eliminating backlash. Unfortunately, however, a crank mechanism does not produce a true sinusoidal oscillation because of the continually changing angle of a link or connecting rod operated by the crank.

The present invention provides the accurately sinusoidal oscillation that is characteristic of a Scotch yoke mechanism and does so entirely by purely rotary motions utilizing highly efficient rotary bearings. In general, the invention accomplishes its purpose of oscillating a rotary driven member by means of what may be termed a gyratory actuator.

The gyratory actuator is carried by a rotary drive member and is positioned at a slight angle to the axis of rotation of the drive member to gyrate when the drive member rotates, the axis of the drive member being perpendicular to the axis of the driven member. A connecting member rotatably mounted on the gyratory actuator is hingedly connected with the rotary driven member and is thereby prevented from rotating with hte gyratory actuator while being free to gyrate therewith. As will be explained, the rotatably mounted connecting member simply swings on its hinge axis in response to the component of the gyratory motion that is perpendicular to the hinge axis. The component of gyration that is along the hinge axis, however, is transmitted directly to the driven member i. e. the oscillatory test table.

An important feature of the invention is the simple and highly efficient arrangement for adjusting the angular range of rotary oscillation of the test table. For this purpose, the gyratory actuator is, in effect, made in two sections. An inner section is fixed to the rotary drive member with its axis inclined in a fixed manner relative to the axis of the drive member. The other outer section is rotatably mounted on the inner section for adjustment relative thereto and has a configuration axis inclined relative to its axis of rotation of the inner section. In this arrangement the effective inclination of the gyratory actuator relative to the axis of the drive member is the sum of the inclination of the outer section relative to the inner section and the inclination of the inner section relative to the drive member. At one extreme of rotary adjustment of the two sections, these two angles of inclination are diametrically opposite and may be equal to cancel out for zero gyration. At the other extreme of adjustment the two angles are additive for a maximum radius of gyratory movement.

A further feature of the invention is the provision of an index means to indicate the adjustment of the two sections of the gyratory actuator relative to each other. In the preferred practice of the invention, the index means indicates the range in degrees of rotational oscillation of the test table.

A still further feature of the invention is the manner in which the apparatus is constructed with tight fitting parts for rigidity of all fixedly connected parts and is constructed with tight bearings for accurate concentric rotation of all rotary parts. These provisions eliminate any possibility of backlash.

The various features and advantages of the invention will be apparent in the following detailed description considered with the accompanying drawings.

In the drawings, which are to be regarded as merely illustrative:

Figure 2 is a view of the embodiment partly in side elevation and partly in section, the section being taken as indicated by the broken line 2—2 of Figure 1;

Figure 3 is an enlarged portion of Figure 2.

Figure 1:
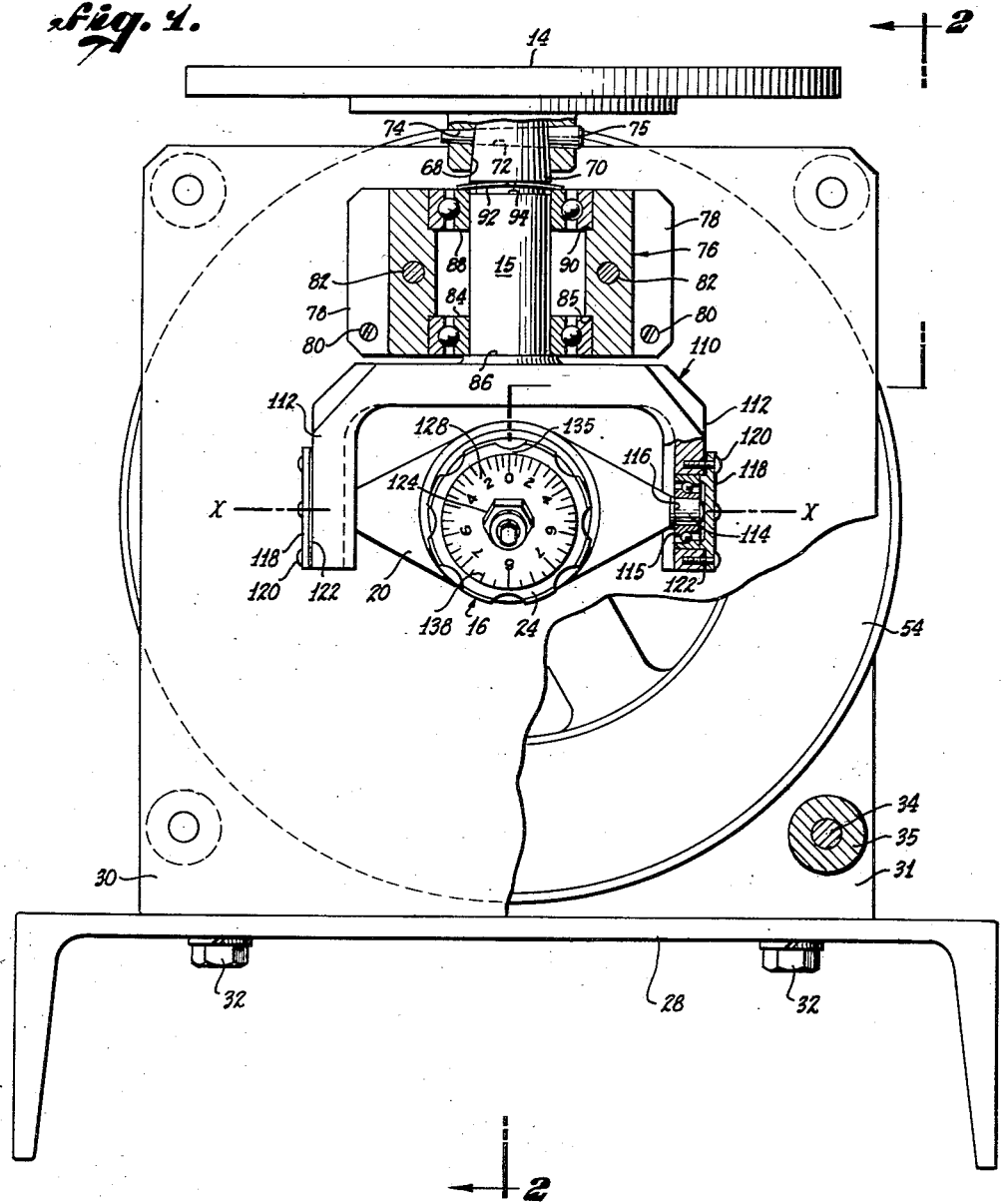
Figure 1 is a front elevation of the presently preferred embodiment of the invention as an oscillatory test table, parts being broken away and shown in section to reveal details of the construction.

By way of example, the drawings illustrate the invention as embodied in a compact oscillating test table. The principal parts of this apparatus include: a drive member in the form of a horizontal shaft 10 that has a protruding end portion 12 that is adapted for connection with a suitable actuating motor; a driven member in the form of a circular test table 14 which is rigidly mounted on a vertical shaft 15; a gyratory actuator, generally designated by the numeral 16, mounted at an angle on the forward end of the drive shaft 10 for rotation therewith; and what may be termed an oscillatory connecting member 20 that is rotatably mounted on the gyratory actuator 16 and is hingedly connected to the vertical driven shaft 15.

The principle of operation of the apparatus may be understood when it is considered that four essential axes of the mechanism intersect at a common point which is indicated at P in Figure 2. The four axes are: the axis of the drive shaft 10; the inclined axis of the peripheral configuration of the gyratory actuator 16; the vertical axis of the vertical shaft 15; and the horizontal axis of the hinge connection between the connecting member 20 and the vertical shaft 15, this axis being the axis X—X in Figure 1. It is apparent that the configuration axis or profile axis of the gyratory actuator 16 gyrates by describing a cone at the point P. The oscillatory connecting member 20 which is rotatably mounted on the gyratory actuator is prevented from rotating therewith but, nevertheless, moves in the same gyratory manner.

The gyratory movement of the gyratory actuator 16 is resolved into two perpendicular components both of which are transmitted to the oscillatory connecting member 20. One of these components is the vertical component which is absorbed by oscillation of the connecting member 20 about the hinge axis X—X without affecting the vertical driven shaft 15. The other horizontal component is transmitted by the oscillatory connecting member 20 to the vertical driven shaft 15 for the desired oscillation of the test table 14.

It will be apparent to those skilled in the art that thus basic concept of an oscillatory drive mechanism characterized by four intersecting axes may be embodied in various constructions in various applications of the invention. The present embodiment is of compact construction and is intended primarily for use in test laboratories, in inspection departments, and the like.

In this particular embodiment, adjustability with respect to the angular range of oscillation of the test table 14 is achieved by making the gyratory actuator 16 in two parts or sections which are rotatably adjustable relative to each other. The inner section of the gyratory actuator is what may be termed an angular axle 22 that is an integral extension of the drive shaft 10 and is incllined relative to the axis of the drive shaft. The outer section of the gyratory actuator which may be regarded as the actuator proper is in the form of a spool 24 having a cylindrical peripheral surface on which the oscillatory connecting member 20 is rotatably mounted.

The spool 24 has a longitudinal bore 26 therethrough by means of which it is rotatably mounted on the angular axle 22 and this longitudinal bore is inclined relative to the axis of the cylindrical peripheral surface of the spool. Since both the axis of curvature of the peripheral surface of the spool and the axis of the angular axle 22 both pass through the point P, there are five axes passing through the point P in this particular embodiment of the invention.

Preferably the inclination of the bore 26 relative to the axis of curvature of the cylindrical peripheral surface of the spool 24 is the same as the inclination of the angular axle 22 relative to the axis of the drive shaft 10. Such an arrangement permits the spool 24 to be rotated on the angular axle 22 to one extreme adjustment for zero oscillation of the test table 14 and to be rotated 180° to the other extreme adjustment for the maximum range of oscillation of the test table. Figure 2 illustrates the zero adjustment at which the peripheral cylindrical surface is concentric to the axis of the drive shaft 10, the inclination of the spool bore 26 compensating completely for the inclination of the angular axle 22. If the spool 24 is rotated 180° to a new position of adjustment on the angular axle 22, the test table 14 will be actuated through a maximum range of oscillation which amounts to 8° in the construction shown.

The working parts of the apparatus are supported by a suitable frame strucure which may comprise a base 28 in the form of a channel member in combination with a pair of spaced upright parallel plates 30 and 31 mounted on the base and attached thereto by suitable cap screws 32. The two upright plates 30 are rigidly interconnected by means of four cap screws 34 in cooperation with heavy spacer sleeves 35 through which the cap screws extend.

The horizontal drive shaft 12 extends through suitable bores 36 and 37 in the two vertical plates 30 and 31, respectively, and is preferably journalled therein by bearing means that may be tightened as required. In the construction shown, two thrust bearings 40 and 42 are used for this purpose.

The inner race of thrust bearing 40 abuts a circumferential shoulder 44 on the drive shaft 10 and the outer race abuts a circumferential shoulder 45 in the bore 36 of the upright plate 30. In like manner, the outer race of the second thrust bearing 42 abuts a circumferential shoulder 46 in the bore 37 of the upright plate 31 and the corresponding inner race abuts suitable adjustable means on the drive shaft 10. In the construction shown this adjustment means comprises a bushing 48 that is threaded onto the drive shaft 10, which bushing has peripheral projection 50 for convenience of adjustment. A special washer 52 may be interposed between the bushing and the inner race in a well known manner. It is apparent that tightening the bushing 48 against the inner race of the thrust bearing 42 will tend to draw the drive shaft 10 through the inner race to the right as viewed in Figure 2, thus tending to shift the inner race of the other thrust bearing 40 in the same direction with consequent tightening of both of the thrust bearings.

A suitable fly wheel 54 may be mounted on the drive shaft 10 between the two upright plates 30. In the construction shown, the fly wheel 54 has a hub 55 with a tapered bore 56 therethrough and the fly wheel is mounted on the drive shaft by means of a pair of wedge members 58. These wedge members 58 conform externally to the configuration of the hub bore 56 and conform internally to the configuration of the drive shaft 10. One of the wedge members is fixed relative to the drive shaft by a suitable spline or key 60. Each of the wedge members 58 is formed with a socket 62 for rotatably seating the round head 64 of a suitable screw 65, and each of these screws 65 is threaded into a corresponding bore 66 in the fly wheel hub 55. Thus the screws 65 may be tightened to wedge the fly wheel 54 rigidly on to the drive shaft 10.

The test table 14 is rigidly mounted on the upper end of the vertical driven shaft 15 and for this purpose may have a tapered socket 68 integral therewith on its underside to fit over a tapered end portion 70 of the shaft. The tapered end portion of the shaft 15 has a transverse bore 72 and the tapered socket 68 has a pair of corresponding transverse bores 74 to receive a tapered wedge element 75. The bores 72 and 74 are dimensioned to permit the tapered wedge element 75 to pull the tapered socket into tight engagement with the tapered end of the shaft 15.

The driven shaft 15 is mounted in a self-tightening bearing assembly that includes a bearing block 76 having opposite flanges 78. The bearing block 76 is mounted on the front face of the vertical frame plate 30 by means of short screws 80 passing through the flanges 78 and by means of longer cap screws 82 passing through the body of the block. A lower ball bearing 84 has its outer race abutting an annular shoulder 85 of the bearing block 76 and has its inner race abutting a shoulder 86 of the driven shaft 15. An upper ball bearing 88 has its outer race abutting an annular shoulder 90 of the bearing block and has its inner race under pressure from a suitable leaf spring 92 that engages a circumferential groove 94 in the driven shaft 15. Thus the pressure exerted by the leaf spring 92 maintains both of the ball bearings 84 and 88 in tight operating condition.

The oscillatory connecting member 20 may be journalled on the spool 24 in any suitable manner and may be hingedly connected with the driven shaft 15 in any suitable manner. In the present embodiment of the invention the oscillatory connecting member 20 is mounted on the spool 24 by a pair of thrust bearings 95 and 96 in a large bore 98 of the connecting member.

The outer race of the thrust bearing 95 abuts an annular shoulder 100 in the large bore 98 and the inner race abuts a circumferential shoulder 102 of the spool 24. In like manner the outer race of the thrust bearing 96 abuts an annular shoulder 104 of the bore 98 and the corresponding inner race abuts a special washer 105 of a well known type that is held in position by an adjustment bushing 106. The adjustment bushing 106 is threaded onto the spool 24 and has peripheral projections 108 for convenience in manually rotating the bushing. It is apparent that tightening the adjustment bushing 106 tightens both of the thrust bearings 95 and 96.

For the purpose of hingedly connecting the driven shaft 15 with the oscillatory connecting member 20, the driven shaft is formed with an integral yoke 110 having a pair of downwardly extending arms 112 and the connecting member 20 is formed with a pair of trunnions 114 that are suitably journalled in the two arms 112, respectively. In the construction shown, each of the trunnions 114 is journalled in the corresponding arm 112 by means of a suitable thrust bearing 115.

The inner race of the thrust bearing 115 abuts a trunnion shoulder 116 and the outer race of the bearing abuts a special pressure plate 118. The pressure plate 118 is mounted on the corresponding yoke arm 112 by a plurality of screws 120 that may be tightened as required to keep the bearing tight. An annular shim 122 may be used under each pressure plate 118, if desired, the shim being thin enough to permit the pressure plate to exert the required pressure against the outer race of the thrust bearing.

It is contemplated that suitable means will be provided to indicate the rotary adjustment of the spool 24 relative to the angular axle 22 and preferably such index means is calibrated in terms of the range in degrees of oscillation of the test table 14. For this purpose, as best shown in Figure 3, a suitable clamp nut 124 is threaded onto the outer end of the angular axle 22 to releasably clamp the spool 24 against a circumferential shoulder 125 of the drive shaft 10, this shoulder being perpendicular to the axis of the angular axle. The clamp nut 124 is mounted on a reduced end portion 126 of the angular axle 22 and presses against an index disc 128 that is mounted on an adjacent hexagonal portion 130 of the angular axle. The hexagonal portion 130 of the angular axle keeps the index disc from rotating but permits the index disc to transmit clamping pressure from the clamp nut 124 to the spool 24. The forward portion of the spool 24 has peripheral projections 132 for convenience in adjusting the rotational position of the spool. The index disc 128 seats in an annular recess 134 in the spool 24 and the spool has an index mark in the form of a dot 135 adjacent the index disc. In the construction shown the range of oscillation of the test table 14 for which the spool 24 may be adjusted extends from zero to 8° and this range is indicated by the corresponding scale 138 on the index disc 128.

The manner in which the invention serves its purpose may be readily understood from the foregoing description. The gyratory actuator 16 comprising the spool 24 on the angular axle 22 gyrates in a conical orbit when the drive shaft 10 rotates. The oscillatory connecting member 20 absorbs the vertical component of the gyration by oscillation about the hinge axis X—X and transmits the horizontal component to the yoke 110 for oscillation of the driven shaft 15 that carries the test table 14. The range of oscillation of the test table 14 may be changed simply by loosening the clamp nut 124 and rotating the spool 24 to place the index dot 135 at the desired value on the scale 138 of the index disc 128. The clamp nut may then be retightened for oscillation of the test table in accord with the new adjustment.

Although the now preferred embodiment of the present invention has been shown and described herein, it is to be understood that the invention is not to be limited thereto, for it is susceptible to changes in form and detail within the scope of the appended claims.

I claim:

1. Means to oscillate a driven member about a given axis comprising: a rotary drive member having an axis of rotation perpendicular to said given axis and intersecting the given axis at a given point; an inclined axle member fixedly carried by said rotary drive member for rotation therewith, the axis of said axle member being inclined relative to the axis of said drive member and intersecting said given point; a gyratory actuator mounted on said axle member for rotatable adjustment thereon concentrically thereof and having a cylindrical peripheral surface with its axis of curvature inclined relative to the axis of the axle member and intersecting said given point whereby the inclination of the axis of curvature of the periphery of the actuator relative to the axis of the rotary drive member varies with the adjustment rotation of the actuator on the axle member; means to releasably fix said actuator at selected rotary positions relative to said axle member, thereby to vary the inclination of the angle of the axis of curvature of said peripheral surface relative to the axis of rotation of the drive member; means rotatably mounted on said peripheral surface of the actuator coaxially thereof for gyration thereby; and means hingedly connecting said rotatably mounted means with said driven member and holding the rotatably mounted means against rotation with the actuator, the axis of the hinge connection passing through said given point perpendicularly of said given axis whereby the rotatably mounted member oscillates about said hinge axis in response to the component of gyration along said given axis and oscillates said driven member in response to the component of gyration along said hinge axis.

2. A combination as set forth in claim 1 in which said inclined axle member and the gyratory actuator thereon are provided with means to indicate their angular relation to each other in terms of degrees of oscillation of said driven member.

3. Means to oscillate a driven member about a given axis comprising: a rotary drive member having an axis of rotation perpendicular to said given axis and intersectng the given axis at a given point; an axle integral with said rotary drive member for rotation therewith, the axis of said axle member being inclined relative to the axis of said drive member and intersecting said given point, said rotary drive member being formed with a shoulder at one end of said axle member; a gyratory actuator mounted on said axle member for rotatable adjustment thereon concentrically thereof and having a cylindrical peripheral surface with its axis of curvature inclined relative to the axis of the axle member and intersecting said given point whereby the inclination of the axis of curvature of the periphery of the actuator relative to the axis of the rotary drive member varies with the adjustment rotation of the actuator on the axle member; means to releasably clamp said actuator against said shoulder thereby to releasably hold the actuator at selected rotary positions relative to said axle member thereby to position the axis of curvature of said peripheral surface at selective angles relative to said drive member; and means hingedly connecting said rotatably mounted means with said driven member and holding the rotatably mounted means against rotation with the actuator, the axis of the hinge connection passing through said given point perpendicularly of said given axis whereby the rotatably mounted member oscillates about said hinge axis in response to the component of gyration along said given axis and oscillates said driven member in response to the component of gyration along said hinge axis.

4. A combination as set forth in claim 3 in which said axle member has a portion of noncircular cross-sectional configuration; and which includes an index member nonrotatably mounted on said noncircular portion between said clamping means and said actuator.

5. Means to oscillate a driven member on a given axis comprising: a rotary drive member having an axis of rotation perpendicular to said given axis and intersecting the given axis at a given point, said drive member having an integral axle portion at one end thereof with the axis of the angle portion inclined relative to the axis of the drive member and intersecting said given point; a gyratory actuator mounted on said axle portion for rotatable adjustment thereon concentrically thereof and having a cylindrical peripheral surface with its axis of curvature inclined relative to the axis of the axle portion and intersecting said given point whereby the inclination of the axis of curvature of the periphery of the actuator relative to the axis of the rotary drive member varies with the adjustment rotation of the actuator on the axle portion; means to releasably fix said actuator at selected rotary positions relative to said axle portion, thereby to vary the inclination of the angle of the axis of curvature of said peripheral surface relative to the axis of rotation of the drive member; means rotatably mounted on said peripheral surface of the actuator coaxially thereof for gyration thereby; and means hingedly connecting said rotatably mounted means with said driven member and holding the rotatably mounted means against rotation with the actuator, the axis of the hinge connection passing through said given point perpendicularly of said given axis whereby the rotatably mounted member oscillates about said hinge axis in response to the component of gyration along said given axis and oscillates said driven member in response to the component of gyration along said hinge axis.

6. A combination as set forth in claim 5 which includes index means to indicate the rotary position of said gyratory actuator relative to said axle portion thereby ot indicate the inclination of the axis of curvature of said peripheral surface relative to the axis of said drive member.

7. A combination as set forth in claim 5 in which said index means includes an index member nonrotatably mounted on the outer end of said axle portion.

8. A combination as set forth in claim 7 in which said index means is calibrated in terms of degrees of the oscillation of said driven member about said given axis.

9. An apparatus for testing the responsiveness of devices to oscillation about an axis in a sinusoidal manner, comprising: a fixed support structure; a substantially horizontal test table for the mounting of said devices thereon; a vertical shaft supporting said test table on said fixed structure for rotation about a given vertical axis; a yoke on said shaft having arms on opposite sides of said given axis; a drive shaft having an axis of rotation perpendicular to said given axis and intersecting the given axis at a given point; said drive shaft having an integral axle portion at one end thereof extending between said yoke arms with the axis of the axle portion inclined relative to the axis of the drive shaft and intersecting said given point; a gyratory actuator mounted on said axle portion for adjustment rotation thereon concentrically thereof and having a cylindrical peripheral surface with its axis of curvature inclined relative to the axis of the axle portion and intersecting said given point whereby the inclination of the axis of curvature of the periphery of the actuator relative to the axis of the rotary drive member varies with the adjustment rotation of the actuator on the axle portion; means to releasably fix said actuator at selected rotary positions relative to said axle portion; thereby to vary the inclination of the angle of the axis of curvature of said peripheral surface relative to the axis of rotation of the drive member; means rotatably mounted on said peripheral surface of the actuator coaxially thereof for gyration thereby; and means hingedly connecting said rotatably mounted means with the two arms of said yoke and holding the rotatably mounted means against rotation with the actuator, the axis of the hinge connection passing through said given point perpendicularly of said given axis whereby the rotatably mounted member oscillates about said hinge axis in response to the component of gyration along said given axis and oscillates said test table about said given axis in response to the component of gyration along said hinge axis.

10. An apparatus as set forth in claim 9 in which said rotatably mounted means is mounted on the peripheral surface of said actuator by a pair of ball type thrust bearings having respective ball races with opposed thrust shoulders and which includes tightening means to urge one of said ball races towards the other.

11. An apparatus as set forth in claim 9 in which said driven member is mounted on said fixed structure by a pair of thrust bearings having respective races with opposed thrust shoulders; and which includes tightening means to urge one of said races towards the other.

12. An apparatus as set forth in claim 9 in which said vertical shaft is mounted in said fixed structure by a pair of spaced ball type bearings having respective races with opposed thrust shoulders; and which includes tightening means to urge at least one of said races towards the other.

13. An apparatus as set forth in claim 9 in which said rotatably mounted means has a pair of coaxial trunnions; in which a pair of thrust bearings journal said trunnions respectively in said yoke arms, said thrust bearings including respective races with opposed thrust shoulders; and which includes tightening means to urge at least one of said races towards the other.

References Cited in the file of this patent

UNITED STATES PATENTS

| 1,819,715 | Le Bret | Aug. 18, 1931 |
| 2,505,978 | Long | May 2, 1950 |
| 2,557,912 | Lane | June 19, 1951 |
| 2,698,465 | Pittman | Jan. 4, 1955 |

FOREIGN PATENTS

| 652,329 | Germany | Oct. 29, 1937 |